March 3, 1931.  W. K. HOWE  1,794,619
CAR RETARDER SYSTEM
Filed Feb. 14, 1927
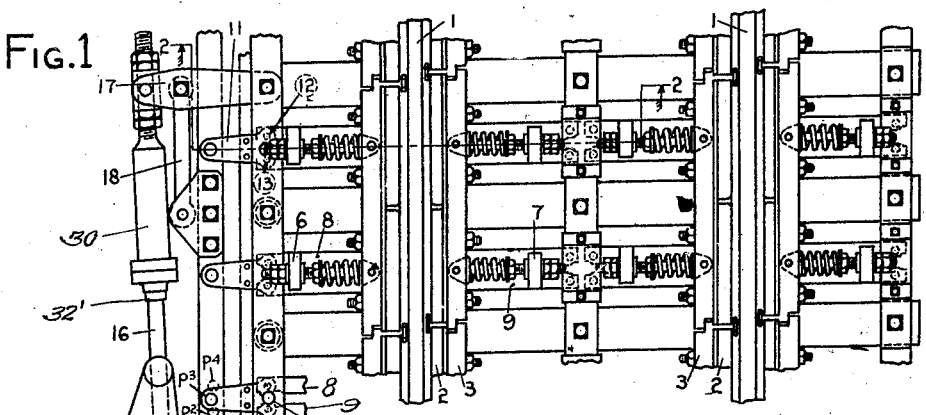
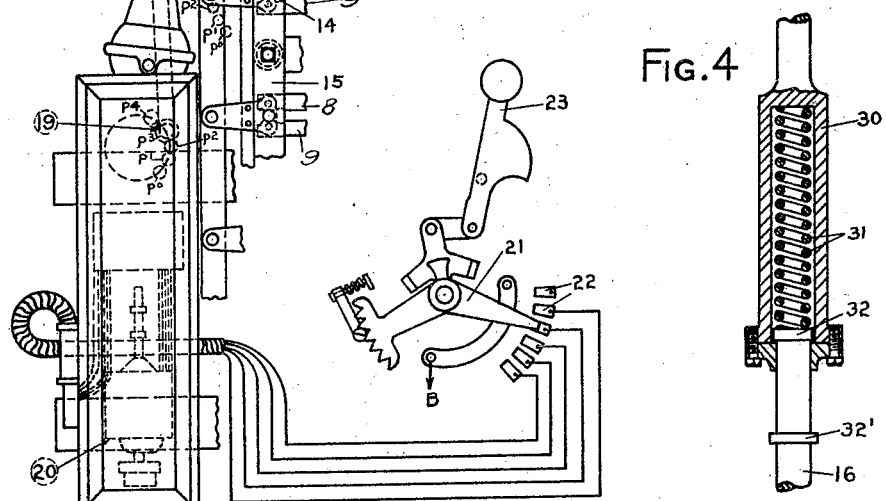
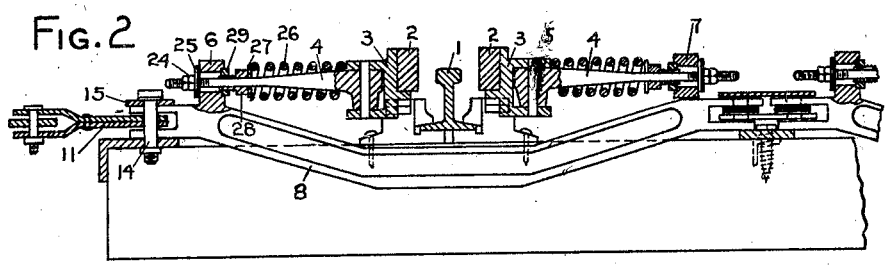
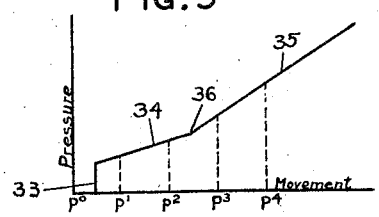
Inventor
W. K. Howe,
By Neil D. Preston,
his Attorney Patented Mar. 3, 1931

1,794,619

UNITED STATES PATENT OFFICE

WINTHROP K. HOWE, OF ROCHESTER, NEW YORK, ASSIGNOR TO GENERAL RAILWAY SIGNAL COMPANY, OF ROCHESTER, NEW YORK

CAR-RETARDER SYSTEM

Application filed February 14, 1927. Serial No. 168,003.

This invention relates in general to the braking of railway vehicles, and has more particular reference to brake means positioned along the track and having spring pressed brake shoes arranged to frictionally bear against the sides of the wheels of a passing vehicle.

In retarders of this character, it is usual to provide a control lever movable to various positions to cause the brake shoes to assume and hold various positions resulting in differing degrees of retardation. This operation contemplates car wheels of constant width, but in practice it is found that car wheels vary as much as 3/4" in thickness thus resulting in varying the retarding effect for a given position of the control lever. With heavy cars, this at most merely changes the actual retardation from the contemplated, and the operator can move the control lever to compensate for the variation of retardation due to variation in wheel thickness, but with light cars, before it can be compensated for, excess retardation may cause the car to ride up on the top of the retarder.

For a further and more detailed description of the car retarder as a whole, except for the novel spring driving connection, attention is called to applicant's co-pending application Serial No. 70,599 filed November 21, 1925.

With the above and other considerations in mind it is proposed, in accordance with the present invention, to provide a car retarder of the above type, with means for minimizing, to a practically negligible amount, variations in retardation of light cars due to wheel thickness variations from normal. More specifically, in combination with the usual main retarder springs, there is used a single secondary spring, arranged in the driving connection for the main springs, and arranged to itself care for light retardation, and to be cut out of operation at heavy retardation which is produced by the main springs.

Further objects, purposes, and characteristic features of the invention will appear as the description progresses, reference being had to the accompanying drawings, showing, solely by way of example, one form of the invention. In the drawings:—

Fig. 1 is a plan view of a part of a retarder, constructed in accordance with this invention;

Fig. 2 is a sectional view on line 2—2 of Fig. 1;

Fig. 3 shows a curve illustrating the brake shoe pressure as a function of movement; and Fig. 4 is a plan view of a detail, with parts broken away.

Referring to the drawings, the structure shown will for the most part be described but briefly, and for a more detailed and complete description thereof, reference should be made to the above mentioned pending application Ser. No. 70,599.

In the drawings is shown a track found by rails 1, and on each side of each rail are brake shoes 2, carried by an articulated brake bar 3. The brake bars 3 are connected, by rods 4, pivoted thereto at 5, to lugs 6 and 7 carried by brake actuating members 8 and 9 respectively, such actuating members being arranged side by side in pairs and operable, simultaneously, in opposite directions by means of levers 11 connected thereto at 12 and 13, and themselves pivoted at 14 to a fixed support 15.

The levers 11 are operated by a pitman 16, through connecting levers 17 and 18, the pitman being moved to its various positions by a crank pin 19 operated by a motor or the like 20, controlled by contact finger 21 and contacts 22, the finger being operated by an arm 23.

Each of the rods 4 is furnished with lock nuts 24 and bearing plates 25, for permitting adjustment of the initial position of the brake shoes 2 relative to the lugs 6 and 7. Secured on each rod 4 is an initially tensioned main retarder spring 26, bearing at one end against the brake bar 3, and at the other against a follower 27 bearing against an adjusting screw 28 carried in a nut 29 bearing against the lugs 6 and 7, the members 27—29 being slidable on the rod 4. By operation of the screw 28, the initial tension of the spring 26 can be adjusted at will.

Included in the driving connection for the levers 11, is a compressible spring joint shown in detail in Fig. 4. This joint includes a housing 30, inclosing an initially tensioned spring 31, bearing at one end against an end of the housing and at the other against a piston 32, slidable therein and carried by the pitman 16, a shoulder 32, on the pitman limiting the inward motion of the piston in the housing.

The curve shown in Fig. 3, represents the pressures exerted on the brake shoes 2, corresponding to movement of the crank pin 19, when a car is in the retarder. The vertical part 33 of the curve represents the initial tension of spring 31, the relatively flat portion 34 represents the tension in spring 31 as the piston 32 is forced into the housing until stopped by the shoulder 32', the relative steep portion 35 represents the variation of tension exerted in the active main springs 26 for various operating positions, the initial tension of the main springs being such that the sum of the initial tensions of those springs that are active at any one time is equal to the pressure at the point 36 of the curve.

The device, as described above, operates in the following manner. On energization of the motor 20, the crank pin 19 assumes one of its operative positions, as indicated in dotted lines in Fig. 1, depending upon the position of contact finger 21 and thus drives the pitman 16 to move the brake shoes 2 inwardly towards the track rails when the retarder is not occupied by a car. The initial tension of spring 31 is sufficient to cause movement of the pitman 16 during the first two operative positions $p'$ $p^2$ (see Fig. 3) to correspondingly move the brake shoe 2 without causing sufficient compression of the spring 31 to bring the shoulder 32' against the housing 30. In other words, the compressible spring joint shown in Fig. 4 functions like a compressible rod for the first two positions referred to and thereafter functions as a rigid rod. On moving the crank pin 19 to positions $p^3$ and $p^4$, the spring 31 is compressed by movement of the piston 32 into the housing 30 until stopped by the shoulder 32' at which time the tension of the spring 31 equals the sum of the initial tensions of the main retarder springs 26 which are active when the retarder is occupied, so that the springs 26 are compressed to increase the tension on the brake shoes 2. Thus it will be seen that for the first two positions $p'$ and $p^2$, when the retarder is occupied, the compressible joint is compressed until stopped by the shoulder 32', the springs 26 in the meantime functioning as though rigid, since their initial tension is too high to permit compression thereof; while at positions $p^3$ and $p^4$ the pitman 16 functions like a rigid rod, and the springs 26 are compressed. In other words for the first part of the operation of the crank pin 19 the entire tensioning of the brake shoes is cared for by the spring 31, then this spring becomes ineffective to exert any tension due to the cutting into action of the springs 26 having an initial tension equal to the point 36 on the curve of Fig. 3, and from thereon the pressure on the brake shoes is exerted by means of the main springs 26.

As pointed out in a general manner at the beginning of this specification, the pressure curve resulting from a spring arrangement as described above, has a relatively flat portion 34 and a relatively steep portion 35. This permits working the brake shoes in the flat portion of the curve for light cars, whereby a variation in the wheel width will cause only a slight variation in brake shoe pressure, and not sufficient to cause the car to ride up on the top of the retarder. For heavier cars, the retarder is worked in the steep portion 35 of the curve, where a variation in wheel width will cause a greater variation in pressure, which however, in the case of a heavy car, will not cause the car to ride up on the retarder. It has been experienced that cars tend to ride out from between brake shoes when the brake shoe pressure is too high as compared with the weight of the car in question. This is especially true of the front wheels of a truck because the shoe pressure at the front part of the wheel is usually higher than it is at the back part of the wheel. By reason of variation in the thickness of the car wheel it is desirable to have the change of pressure due to variation in the thickness of car wheels have a less pronounced effect for the lighter cars where less pressure is exerted than it will have for heavy cars where a high pressure is exerted, and for this reason it is desirable to have spring means having an upturned pressure-deformation characteristic.

Furthermore, by having a pressure curve as shown in Fig. 3 it is possible to attain a high braking pressure by working in the steep portion of the curve, without necessitating as great a movement of the actuating parts as would be necessary if the curve were a straight line with a slope the same as that portion 34. In this manner, high pressures are obtainable without requiring large movements of the actuating parts. In other words, applicant's arrangement affords a car retarder in which spring means is employed having an up-turned pressure-deformation characteristic.

The initial tensions of the springs 31 and 26 can be varied so as to bear different relations to each other to thereby change the pressure curve from the one shown in Fig. 3 to any desired one and it is contemplated that various relations between the initial tensions, and also the rigidity of the springs 31 and 26, will be used in accordance with the particular attendant circumstances.

The above specific description of one form of the invention is given solely by way of example, and is not intended, in any manner whatsoever, in a limiting sense. Obviously, the invention can assume many different physical forms, and is susceptible of numerous modifications, and all such forms and modifications are intended to be included in this application, as come within the scope of the appended claims.

Having described my invention, I now claim:—

1. In a car retarder for engaging the sides of the wheels of passing cars, a brake shoe, actuating means for the shoe, tensioning means in the actuating means, including, separate initially tensioned spring means arranged to have their tensions varied upon operation of the actuating means, and means to positively limit the tensioning of one of the spring means, to a tension substantially equal to the active initial tension of the other spring means.

2. In a car retarder of the type engaging the sides of passing wheels, a brake shoe, an actuator for the brake shoe, and initially tensioned separate spring means for the shoe, variable by the actuator to follow a pressure curve having a relatively flat and a relatively steep portion directly connected one to the other.

3. In a car retarder of the type engaging the sides of passing wheels, a brake shoe, an actuator for the brake shoe, and initially tensioned separate spring means for the shoe, variable by the actuator to follow a pressure curve having a relatively flat and a relatively steep portion directly connected one to the other.

4. In a car retarder of the type engaging the sides of passing wheels, a brake shoe, an actuator for the brake shoe, and initially tensioned separate spring means for the shoe, variable by the actuator to follow a pressure curve having a relatively flat and a relatively steep portion directly connected one to the other, one of the spring means corresponding to the flat and the other to the steep portions, respectively.

5. In a car retarder, a brake shoe, an actuating beam, an initially tensioned main spring connection between the shoe and beam, an actuator for the beam, and a compressible spring joint inserted in the actuator.

6. In a car retarder, a brake shoe, an actuating beam, an initially tensioned main spring connection between the shoe and beam, an actuator for the beam, and an initially tensioned compressible spring joint inserted in the actuator.

7. In a car retarder, a brake shoe, an actuating beam, an initially tensioned main spring connection between the shoe and beam, an actuator for the beam, an initially tensioned compressible spring joint inserted in the actuator, and means for positively limiting the extent of compression of the spring joint.

8. In a car retarder, a brake shoe, an actuating beam, and initially tensioned main spring connection between the shoe and beam, an actuator for the beam, initially tensioned compressible spring joint inserted in the actuator, and means for positively limiting the extent of the compression of the spring joint to not exceed the initial tension in the main spring connection.

9. In a car retarder for engaging the sides of wheels of passing cars, the combination with a track rail, brake shoes on opposite sides of said rail, shoe beams arranged parallel to said brake shoes, compression springs between said shoe beams and brake shoes, actuating means for simultaneously moving said beams towards said rail, and spring means included within said actuating means for causing the active pressure exerted by said brake shoes against the car wheels to increase at a lower rate per unit of movement of the actuating means for the lower pressures than it increases per unit of movement of the actuating means for the higher pressures.

10. In a car retarder for engaging the sides of wheels of passing cars, the combination with a track rail, brake shoes on opposite sides of said rail, shoe beams arranged parallel to said brake shoes, compression springs between said shoe beams and brake shoes, actuating means for simultaneously moving said beams towards said rail, and spring means included within said actuating means for causing the active pressure exerted by said brake shoes against the car wheels to increase as compared with the extent of movement of the actuating means, thus constituting a spring device having an up-turned pressure-deformation characteristic.

In testimony whereof I affix my signature.

WINTHROP K. HOWE.